United States Patent
Mair et al.

(10) Patent No.: US 11,554,721 B2
(45) Date of Patent: Jan. 17, 2023

(54) SLIDING STEP ASSEMBLY FOR A MOTOR VEHICLE OR FOR A RAIL VEHICLE

(71) Applicant: KNORR-BREMSE GESELLSCHAFT MIT BESCHRANKTER HAFTUNG, Mödling (AT)

(72) Inventors: Andreas Mair, Oberschlierbach (AT); Johann Wilflinger, Linz (AT)

(73) Assignee: Knorr-Bremse Gesellscaft mit beschränkter Haftung, Mödling (AT)

( * ) Notice: Subject to any disclaimer, the term of this patent is extended or adjusted under 35 U.S.C. 154(b) by 789 days.

(21) Appl. No.: 16/470,349

(22) PCT Filed: Nov. 3, 2017

(86) PCT No.: PCT/EP2017/001277
§ 371 (c)(1),
(2) Date: Jun. 17, 2019

(87) PCT Pub. No.: WO2018/108299
PCT Pub. Date: Jun. 21, 2018

(65) Prior Publication Data
US 2020/0114937 A1    Apr. 16, 2020

(30) Foreign Application Priority Data

Dec. 17, 2016   (DE) ...................... 10 2016 015 128.5

(51) Int. Cl.
*B60R 3/02* (2006.01)
*B61D 23/02* (2006.01)
*H02K 41/03* (2006.01)

(52) U.S. Cl.
CPC .............. *B60R 3/02* (2013.01); *B61D 23/025* (2013.01); *H02K 41/031* (2013.01)

(58) Field of Classification Search
CPC ...... B61D 23/00; B61D 23/02; B61D 23/025; B61D 1/00; B61D 13/00; B60R 3/00;
(Continued)

(56) References Cited

U.S. PATENT DOCUMENTS 5,225,725 A * 7/1993 Shiraki ................ H02K 41/031
                                                318/135
5,357,869 A * 10/1994 Barjolle ................. A61G 3/061
                                                280/166
(Continued)

FOREIGN PATENT DOCUMENTS

DE       19531284 A1 *  2/1997  ........... B61D 23/025
DE       19531284 A1    2/1997
(Continued)

OTHER PUBLICATIONS

International Search Report corresponding to PCT/EP2017/001277, dated Jan. 24, 2018.

*Primary Examiner* — Zachary L Kuhfuss
*Assistant Examiner* — Cheng Lin
(74) *Attorney, Agent, or Firm* — Barnes & Thornburg LLP

(57) ABSTRACT

Disclosed embodiment provide a sliding step assembly for a vehicle or a rail vehicle, comprising at least one footboard, which is guided on a guiding device for movement along a travel path between a retracted position and an extended position by driving by a drive. The drive contains at least one electrical linear motor operating without contact, wherein the driving force of the electrical linear motor is transferred to the footboard without mechanical connection.

10 Claims, 2 Drawing Sheets

(58) Field of Classification Search
CPC ........... B60R 3/02; B60R 3/002; B60R 3/007;
H02K 1/16; H02K 1/17; H02K 1/2726;
H02K 41/03; H02K 41/031
See application file for complete search history.

(56) References Cited

U.S. PATENT DOCUMENTS

| | | | | |
|---|---|---|---|---|
| 5,684,344 | A | * | 11/1997 | Takei .................. H02K 41/031 104/294 |
| 8,217,538 | B2 | * | 7/2012 | Shoda .................... H02K 41/03 310/12.05 |
| 2018/0030662 | A1 | | 2/2018 | Noe et al. |

FOREIGN PATENT DOCUMENTS

| | | | | | |
|---|---|---|---|---|---|
| DE | 102004036038 | A1 | | 9/2005 | |
| DE | 102014203049 | A1 | * | 8/2015 | ............... B60R 3/02 |
| DE | 102014203049 | A1 | | 8/2015 | |
| DE | 102015001746 | A1 | | 8/2016 | |
| EP | 1858142 | A1 | | 11/2007 | |
| EP | 2910427 | B1 | | 8/2015 | |
| KR | 1020050075492 | A | | 4/2005 | |
| KR | 20050075492 | A | * | 7/2005 | ............... B60R 3/02 |
| WO | 2007131789 | A1 | | 11/2007 | |
| WO | WO-2007131789 | A1 | * | 11/2007 | ........... H02K 41/031 |

* cited by examiner

SLIDING STEP ASSEMBLY FOR A MOTOR VEHICLE OR FOR A RAIL VEHICLE

CROSS REFERENCE AND PRIORITY CLAIM

This patent application is a U.S. National Phase of International Patent Application No. PCT/EP2017/001277, filed Nov. 3, 2017, which claims priority to Germen Patent Application No. 10 2016 015 128.5, filed Dec. 17, 2016, the disclosures of which are incorporated herein by reference in their entirety.

FIELD

Disclosed embodiments relate to a sliding step assembly for a motor vehicle or for a rail vehicle, having at least one step board which, driven by a drive, is guided on a guide device so as to be movable along a movement travel between a retracted position and a deployed position. Disclosed embodiments also relate to a vehicle, in particular a rail vehicle having at least one sliding step assembly.

BACKGROUND

A sliding step assembly of the type is known for example from DE 10 2014 203 049 A1. For example, such sliding step assemblies are used in vehicles for passenger conveyance in order to facilitate embarking and disembarking and in order to avoid a risk to persons. For example, in the case of a rail vehicle, the step board of the sliding step assembly serves for bridging the gap between the rail vehicle and a railway platform when the rail vehicle stops at a station. This prevents passengers from falling into the respective gap. Also, in the case of buses, the step board may serve for covering the gap between the vehicle and a curb edge. The step board may also serve for bridging a height difference between a platform of the vehicle and the railway platform or sidewalk in order to facilitate embarking and disembarking with wheelchairs and perambulators. Not least, a sliding step assembly of the type may also be used in the case of vehicles for conveying sick or disabled persons, for example in order, by the deployed step board, to form a path for a mobile stretcher or a wheelchair between a vehicle platform and a road or a sidewalk.

Here, the step board may be moved back and forth between a retracted position (rest position) and a deployed position (working position) by a drive, and, for this purpose, is guided for example on two rails, which are arranged parallel to one another, of the guide device. The guidance of the step board is normally realized by rollers.

As a drive for the step board, use has hitherto been made exclusively of drives involving contact, such as for example belt drives, spindle drives or pneumatic cylinders. Dirt, icing, deformation of the vehicle structure in the region of the sliding step assembly or temperature influences can however result in such a drive becoming blocked, such that the sliding step assembly is rendered non-functional. If the structural space taken up by the sliding step assembly is also determined by the drive. Furthermore, so-called vandalism can result in destruction of or initial damage to the drive train.

SUMMARY

Disclosed embodiments provide a sliding step assembly for a motor vehicle or for a rail vehicle of the type mentioned in the introduction such that the above-described problems are avoided.

Disclosed embodiments, likewise, provide a vehicle, in particular a rail vehicle, having a sliding step assembly of the type.

BRIEF DESCRIPTION OF THE FIGURES

Disclosed embodiments will be described in more detail below on the basis of an exemplary embodiment with reference to the appended drawing, in which.

DETAILED DESCRIPTION

Figure 1:
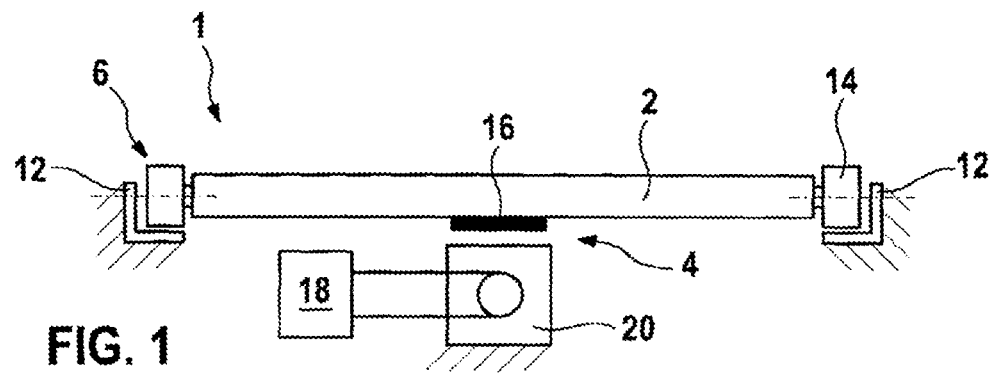
FIG. 1 shows a plan view of a sliding step assembly of a rail vehicle according to a disclosed embodiment.

Disclosed embodiments provide a sliding step assembly for a motor vehicle or for a rail vehicle, having at least one step board which, driven by a drive, is guided on a guide device so as to be movable along a movement travel between a retracted position and a deployed position. Here, the movement travel expressly includes the retracted position and the deployed position.

Here, the step board is moved by the drive back and forth between the retracted position (rest position) and the deployed position (working position), though may also be stopped and held at any desired position situated between the retracted position (rest position) and the fully deployed position (working position).

Disclosed embodiments may provide the sliding step assembly in a rail vehicle. This is to be understood to mean a track-bound vehicle, such as a locomotive, a rail motor set, a rail motor coach, a tram, a subway vehicle, a carriage such as a passenger train and/or goods car, in particular a high-speed rail vehicle. Alternatively, the sliding step assembly may be used for any other type of vehicle which is provided in particular for transporting persons, for example also for buses, patient transport vehicles, vehicles for transporting disabled persons etc.

Disclosed embodiments may include a drive that comprises at least one contactlessly operating electric linear motor, the drive force of which is transmitted to the step board for example purely magnetically (Lorentz forces or reluctance forces) and without a mechanical connection, that is to say without the action of mechanical forces. The drive force, acting on the step board, of the contactlessly operating electric linear motor is in this case to be distinguished from the guide force which acts between the guide device and the step board and which may be realized by way of contact, that is to say by mechanical forces, or else likewise in contactless fashion, for example, by magnetic forces.

The contactlessly operating electric linear motor may for example comprise multiple permanent magnets lined up with one another in a linear row and multiple exciter coils which contactlessly interact with the permanent magnets and which are lined up with one another in a linear row and which are electrically energized by a controller, wherein the magnetic fields generated by the permanent magnets and by the exciter coils overlap and generate magnetic forces which move the step board along the movement travel. Here, the drive force is consequently generated by the Lorentz force, as is conventional in the case of magnetically excited electric drives.

Alternatively, the contactlessly operating electric linear motor may also be formed by a reluctance motor, in the case of which the drive force is generated (exclusively) by reluctance force and not to a major extent by the Lorentz force, as is the case in magnetically excited electric drives.

The advantage of these measures lies in the fact that, in the case of such a contactlessly operating electric linear motor, larger geometrical tolerances are generally admissible, which make the linear motor in particular less sensitive to distortion and dirt in the region of the sliding step assembly. The sliding step assembly is then more reliable in terms of its function, and also requires less maintenance.

As already mentioned above, the contactlessly operating electric linear motor comprises multiple permanent magnets lined up with one another in a linear row and multiple exciter coils which contactlessly interact with the permanent magnets and which are lined up with one another in a linear row and which are electrically energized by a controller, wherein the magnetic fields generated by the permanent magnets and by the exciter coils overlap and generate magnetic forces which can move the step board in both directions along the movement travel. Here, the exciter coils are electrically energized by the electronic controller so as to generate resultant magnetic forces which move the step board in the respectively desired direction and with the respectively desired speed and acceleration.

Here, provision may be made in particular whereby:

a) the multiple permanent magnets which are lined up with one another in a linear row (armature) are arranged on the step board and the multiple exciter coils which are lined up with one another in a linear row (stator) are arranged on a static support region, or whereby b) the multiple permanent magnets which are lined up with one another in a linear row (stator) are arranged on the static support region and the multiple exciter coils which are lined up with one another in a linear row are arranged on the step board (armature).

The static support region of the sliding step assembly is for example directly or indirectly fastened to a car body of the vehicle or rail vehicle, or forms a part thereof. In particular, the multiple permanent magnets which are lined up with one another in a linear row are arranged, and the controller electrically energizes the multiple exciter coils which are lined up with one another in a linear row, such that the step board is pulled and/or pushed in the desired direction, or held in the desired position, by the magnetic forces. The permanent magnets and/or the exciter coils may be arranged in in each case one plane, wherein the planes are parallel to one another and at least partially overlap. The rows of the permanent magnets and of the exciter coils are in particular parallel.

In one refinement, provision may also be made whereby the multiple permanent magnets which are lined up with one another in a linear row and the multiple exciter coils which are lined up with one another in a linear row are arranged, and/or the multiple exciter coils which are lined up with one another in a linear row are electrically energized, such that the magnetic forces are dependent on the position of the step board on the movement travel. Therefore, the drive force acting on the step board is varied in a manner dependent on the position of the step board on the movement travel, or the drive force is a function of the positions of the step board on the movement travel.

For example, it may be required that the drive force for deploying the step board from the retracted position into the deployed position is greater in the retracted position than over the rest of the movement travel, for example in order to overcome high breakaway forces owing to constraint or icing in the region of the guide device. In general, the at least one contactlessly operating electric linear motor may be controlled in open-loop or closed-loop fashion by an electronic open-loop or closed-loop control device with regard to a position to be moved to, speed to be attained, acceleration to be attained, or drive force to be attained, by the step board within the movement travel.

It is optionally possible for at least one exciter coil of the multiple exciter coils to be a constituent part of a force sensor which directly or indirectly measures the load acting on the step board. Then, at least one of the multiple exciter coils has an advantageous dual function in that it serves firstly for generating the drive force and secondly as a constituent part of the force sensor. As a force sensor which comprises a coil, use may for example be made of a Hall sensor. This applies equivalently for at least one permanent magnet.

The movement travel of the step board is not restricted to a straight movement travel. Rather, the step board may also be guided along an entirely or partially curved movement travel by the guide device.

The guide device may be arranged in a sliding step cassette from which the step board can be retracted and deployed, wherein the at least one contactlessly operating electric linear motor is arranged at least partially in the sliding step cassette.

The invention also relates to a vehicle, in particular a rail vehicle, having at least one sliding step assembly described above.

Figure 2:
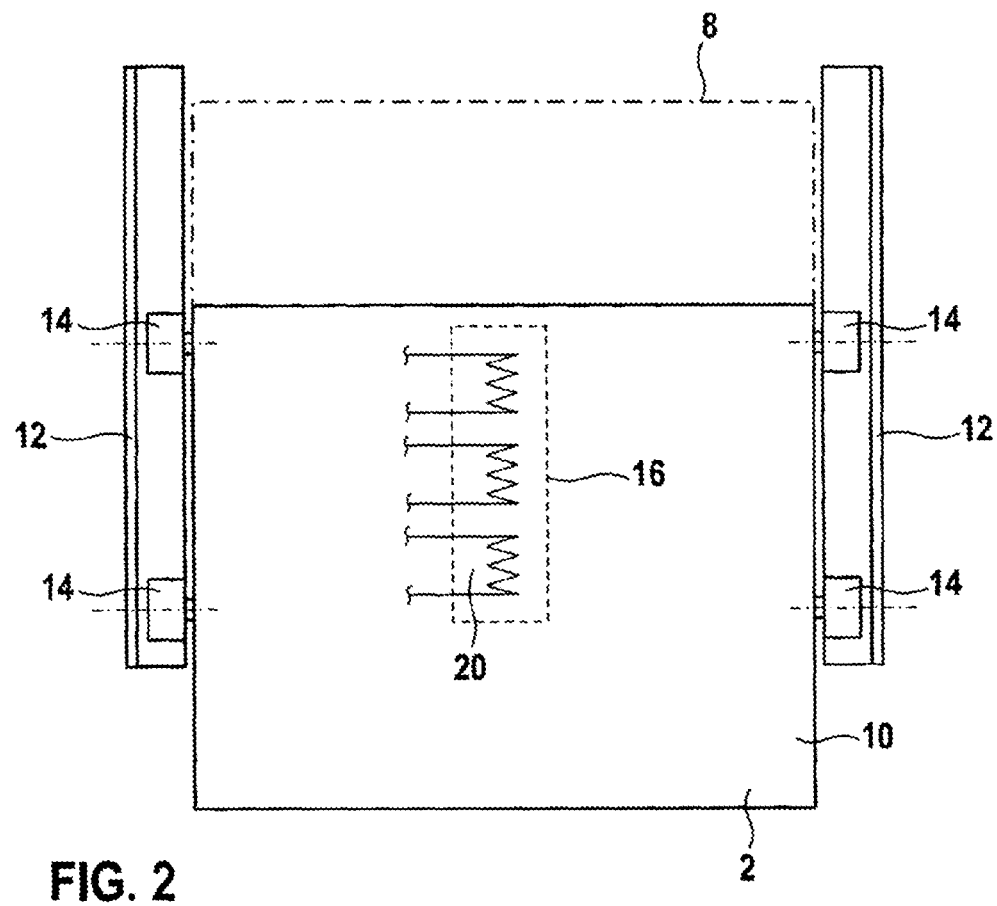
FIG. 2 shows a front view of the sliding step assembly from FIG. 1.
Figure 3:
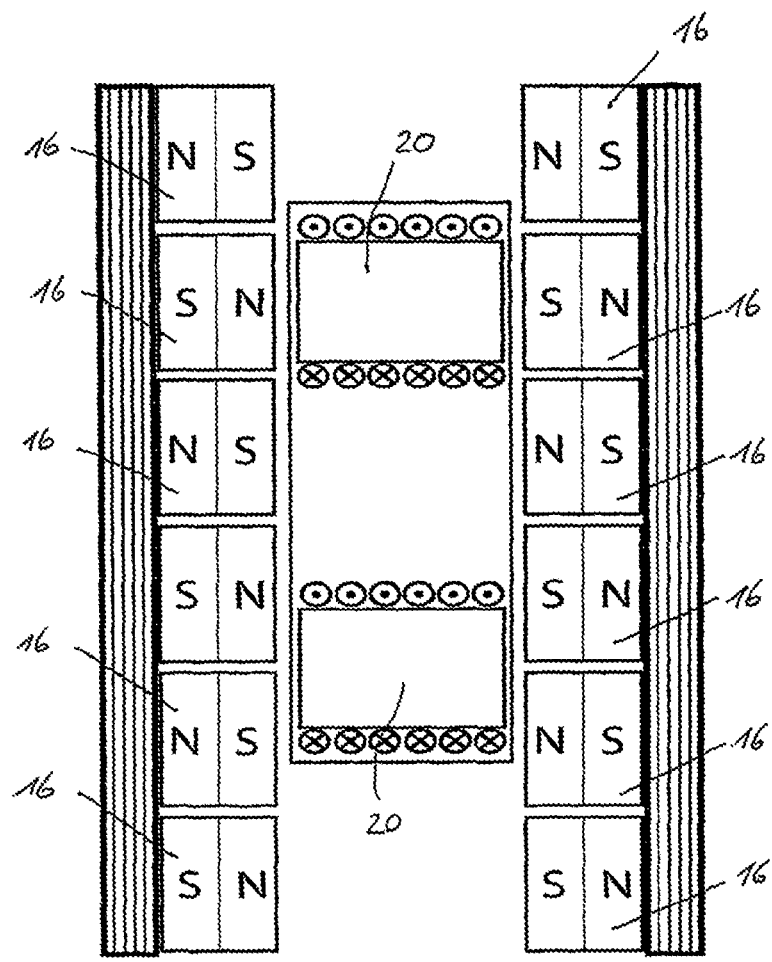
FIG. 3 shows a diagrammatic illustration of a linear motor such as may be used in the sliding step assembly of FIG. 1 and FIG. 2.

A disclosed embodiment of a sliding step assembly 1 shown in FIG. 1 to FIG. 3 may be used for example in a rail vehicle for passenger conveyance.

The sliding step assembly 1 comprises for example a sliding step cassette (not illustrated here) from which a step board 2 can be retracted and deployed along a movement travel, which in this case is for example straight and linear, by a contactlessly operating electric linear motor 4. By a guide device 6 which is in this case linear, the step board 2 is guided linearly with respect to the sliding step cassette, which is arranged for example at the floor on a car body of the rail vehicle.

The sliding step cassette forms a static support region of the sliding step assembly and is directly or indirectly fastened to, or forms a part of, the car body of the rail vehicle. The step board 2 may be moved along the movement travel between a retracted position 8, symbolized in FIG. 2 by a dash-dotted line, and a deployed position 10, symbolized in FIG. 2 by a solid line, wherein the retracted position in the traveling state of the rail vehicle constitutes a holding position and the deployed position in the event of a stoppage with embarking and disembarking of persons constitutes a further holding position, that is to say a position in which the step board is at least temporarily held. In this respect, the retracted position 8 and the deployed position 10 each constitute extreme positions of the movement travel. In particular, however, intermediate positions between the two extreme positions 8, 10 are also possible as holding positions.

Here, the guide device 6 comprises, for example, a pair of guide rails 12 which are arranged in the sliding step cassette and in which, in particular, rollers 14 rotatably mounted laterally on the step board 2 can roll. The drive of the step board 2 relative to the sliding step cassette is realized by the contactlessly operating electric linear motor 4, wherein the contactlessly operating electric linear motor 4 is, in a manner dependent on the position of the step board, arranged at least partially in the step board cassette.

The contactlessly operating electric linear motor 4 may in this case comprise for example multiple permanent magnets 16 lined up with one another in a linear row and multiple exciter coils 20 which contactlessly interact with the permanent magnets 16 and which are lined up with one another in a linear row and which are electrically energized by an electronic controller 18.

In the example of FIG. 3, two parallel rows of permanent magnets 16, each with a north and south pole, may be arranged one behind the other in a plane. In the linear row of the permanent magnets 16, portions of opposite polarity may be situated opposite one another. In the present case, two exciter coils 20 which are likewise lined up one behind the other in a linear row are for example provided, wherein the magnetic fields of the permanent magnets 16 and of the exciter coils 20 at least partially overlap. The linear rows of the permanent magnets 16 and of the exciter coils 20 are in particular parallel. Here, provision is made in particular whereby the permanent magnets (armature) 16 are arranged on the step board and the exciter coils (stator) 20 are arranged on the sliding step cassette. It would alternatively be possible for the permanent magnets (stator) 16 to be arranged on the sliding step cassette and for the exciter coils 20 to be arranged on the step board (armature).

As shown in FIG. 1, the permanent magnets 16 and the exciter coils 20 may be arranged in in each case one plane, wherein the planes are parallel to one another and at least partially overlap. The magnetic fields generated by the permanent magnets 16 and by the exciter coils 20 overlap and generate magnetic forces which move the step board 2 along the movement travel. Consequently, here, the drive force is generated by the Lorentz force, as is common in the case of magnetically excited electric drives.

Alternatively, the contactlessly operating electric linear motor 4 may also be formed by a reluctance motor, in the case of which the drive force is generated (exclusively) by reluctance force and not to a major extent by the Lorentz force, as is the case in magnetically excited electric drives.

The exciter coils 20 are electrically energized by an electronic controller 18 so as to generate resultant magnetic forces which move the step board 2 in the respectively desired direction and with the respectively desired speed and acceleration along the movement travel. In particular, the permanent magnets 16 are arranged, and the exciter coils 20 are electrically energized by the electronic controller 18, in such a way that the step board 2 is pulled and/or pushed in the desired direction by the resultant magnetic forces.

Here, provision may also be made whereby the permanent magnets 16 and the exciter coils 20 are arranged, and/or the exciter coils 20 are electrically energized, such that the magnetic forces are dependent on the position of the step board 2 on the movement travel. Then, the drive force acting on the step board 2 is varied in a manner dependent on the position of the step board 2 on the movement travel, or the drive force for the step board 2 is a function of the position of the step board 2 on the movement travel.

For example, it may be required that the drive force for deploying the step board 2 from the retracted position 8 into the deployed position 10 is greater in the retracted position 8 than over the rest of the movement travel, for example in order to overcome high breakaway forces owing to constraint or icing in the region of the guide device 6.

In general, the at least one contactlessly operating electric linear motor 4 may be controlled in open-loop or closed-loop fashion by an electronic open-loop or closed-loop control device with regard to a position to be moved to, speed to be attained, acceleration to be attained, or drive force to be attained, by the step board 2 within the movement travel. In particular, in the context of closed-loop control, sensors which generate feedback signals of actual values, such as travel, speed, acceleration or force sensors, may be provided.

In at least one embodiment, at least one exciter coil of the exciter coils 20 may be a constituent part of a force sensor which directly or indirectly measures the load acting on the step board 2. As a force sensor, which may comprise a coil, the disclosed embodiments may be made of a Hall sensor.

The movement travel of the step board 2 is not restricted to a straight movement travel. Rather, the step board 2 may also be guided along an entirely or partially curved movement travel by the guide device 6.

The scope of the invention also encompasses embodiments which comprise any desired combination of features of the embodiments described herein.

LIST OF REFERENCE DESIGNATIONS

1 Sliding step assembly
2 Step board
4 Linear motor
6 Guide device
8 Retracted position
10 Deployed position
12 Guide rails
14 Rollers
16 Permanent magnets
18 Controller
20 Exciter coils

The invention claimed is:

1. A sliding step assembly for a vehicle or a rail vehicle, the sliding step assembly comprising:
   at least one step board;
   a drive; and
   a guide device,
   wherein the at least one step board is driven by the drive, is guided on the guide device so as to be movable along a movement travel between a retracted position and a deployed position,
   wherein the drive comprises at least one contactlessly operating electric linear motor, and
   wherein the drive force thereof is transmitted to the step board without a mechanical connection,
   wherein the contactlessly operating electric linear motor comprises multiple permanent magnets lined up with one another in a linear row and multiple exciter coils which contactlessly interact with the permanent magnets and which are lined up with one another in a linear row and which are electrically energized by a controller, wherein the magnetic fields generated by the permanent magnets and by the exciter coils overlap and generate magnetic forces which move the step board along the movement travel,
   wherein the controller electrically energizes the multiple exciter coils such that the magnetic or drive forces are varied dependent on the position of the step board on the movement travel and the drive forces to be attained.

2. The sliding step assembly of claim 1, wherein:
   the multiple permanent magnets which are lined up with one another in a linear row are arranged on the step board and the multiple exciter coils which are lined up with one another in a linear row are arranged on a static support region, or in the multiple permanent magnets which are lined up with one another in a linear row are arranged on the static support region and the multiple exciter coils which are lined up with one another in a linear row are arranged on the step board.

3. The sliding step assembly of claim 1, wherein the multiple permanent magnets which are lined up with one another in a linear row are arranged, and the controller electrically energizes the multiple exciter coils which are lined up with one another in a linear row, such that the step board is pulled and/or pushed in the desired direction by the magnetic forces.

4. The sliding step assembly of claim 3, wherein at least one exciter coil of the multiple exciter coils is a constituent part of a force sensor which directly or indirectly measures the load acting on the step board.

5. The sliding step assembly of claim 1, wherein the contactlessly operating electric linear motor is a reluctance motor.

6. The sliding step assembly of claim 1, wherein the step board is guided along a straight and/or curved movement travel by the guide device.

7. The sliding step assembly of claim 1, wherein the guide device is arranged in a sliding step cassette from which the step board is retracted or deployed, wherein the at least one contactlessly operating electric linear motor is arranged at least partially in the sliding step cassette.

8. The sliding step assembly of claim 1, wherein the at least one contactlessly operating electric linear motor is controlled in open-loop or closed-loop fashion by an electronic open-loop or closed-loop control device with regard to a position to be moved to, speed to be attained, acceleration to be attained, or drive force to be attained, by the step board within the movement travel.

9. A rail vehicle having at least one sliding step assembly as claimed in claim 1.

10. The sliding step assembly of claim 1, wherein the drive force for deploying the step board from the retracted position into the deployed position is greater in the retracted position than over the rest of the movement travel.

* * * * *